(12) United States Patent
Bryant et al.

(10) Patent No.: US 9,927,310 B2
(45) Date of Patent: Mar. 27, 2018

(54) STRAIN SENSOR ASSEMBLY

(71) Applicants: Thomas M. Bryant, Glastonbury, CT (US); Phillip T. Harkawik, Fairfield, CT (US); Joseph E. Nord, Plantsville, CT (US); Danny Shapiro, Brandford, CT (US); Neal Wostbrock, Wallingford, CT (US)

(72) Inventors: Thomas M. Bryant, Glastonbury, CT (US); Phillip T. Harkawik, Fairfield, CT (US); Joseph E. Nord, Plantsville, CT (US); Danny Shapiro, Brandford, CT (US); Neal Wostbrock, Wallingford, CT (US)

(73) Assignees: APS Technology, Inc., Wallingford, CT (US); Strain Measurement Devices Inc., Wallingford, CT (US)

( * ) Notice: Subject to any disclaimer, the term of this patent is extended or adjusted under 35 U.S.C. 154(b) by 569 days.

(21) Appl. No.: 14/171,261

(22) Filed: Feb. 3, 2014

(65) Prior Publication Data
US 2015/0219508 A1 Aug. 6, 2015

(51) Int. Cl.
*G01L 1/22* (2006.01)
*G01L 5/16* (2006.01)
*E21B 47/00* (2012.01)

(52) U.S. Cl.
CPC ............ *G01L 1/22* (2013.01); *E21B 47/0006* (2013.01); *G01L 5/165* (2013.01); *Y10T 29/49117* (2015.01)

(58) Field of Classification Search
CPC ........ G01P 15/18; G01L 1/2225; G01L 1/205; G01N 2291/106
USPC ............ 73/152.48–152.49, 862.041–862.045
See application file for complete search history.

(56) References Cited

U.S. PATENT DOCUMENTS

| | | |
|---|---|---|
| 3,255,627 A | 6/1966 | Doig |
| 3,466,597 A | 9/1969 | Richter |
| 3,686,942 A | 8/1972 | Chatard |
| 3,961,524 A | 6/1976 | De La Cruz |

(Continued)

FOREIGN PATENT DOCUMENTS

GB 1482494 8/1977

OTHER PUBLICATIONS

International Application No. PCT/US2015/014308: International Search Report and Written Opinion dated Jun. 10, 2015, 18 pages.

(Continued)

*Primary Examiner* — Peter Macchiarolo
*Assistant Examiner* — Anthony W Megna Fuentes
(74) *Attorney, Agent, or Firm* — Baker & Hostetler LLP

(57) ABSTRACT

A strain sensor assembly is configured to detect one or more of forces applied to a structure having a recess. The strain sensor can include at least a pair of opposed strain gauge members that extend from the support member. Each strain gauge member defines a support portion carried by the support member and a biasing portion. The support portion includes at least one strain gauge sensor. The biasing portion is configured to bias against a wall of the recess of the structure when the strain sensor assembly is disposed in the recess. The strain sensor assembly is configured such that the at least a pair of strain gauge members form an interference fit with the wall of the recess when the strain sensor assembly is inserted in the recess.

13 Claims, 11 Drawing Sheets

(56) References Cited

U.S. PATENT DOCUMENTS

| | | | |
|---|---|---|---|
| 3,968,473 A | 7/1976 | Patton | |
| 3,985,025 A * | 10/1976 | Ormond | G01L 1/26 |
| | | | 177/255 |
| 4,303,994 A | 12/1981 | Tanguy | |
| 4,324,297 A | 4/1982 | Denison | |
| 4,359,898 A | 11/1982 | Tanguy | |
| 4,445,578 A | 5/1984 | Millheim | |
| 4,448,083 A * | 5/1984 | Hayashi | G01L 5/161 |
| | | | 73/862.042 |
| 4,461,171 A | 7/1984 | De La Cruz | |
| 4,479,564 A | 10/1984 | Tanguy | |
| 4,507,735 A | 3/1985 | Moorehead | |
| 4,608,861 A | 9/1986 | Wachtler | |
| 4,662,458 A | 5/1987 | Ho | |
| 4,680,858 A | 7/1987 | Johnson | |
| 4,709,726 A | 12/1987 | Fitzgibbons | |
| 4,715,451 A | 12/1987 | Bseisu | |
| 4,739,841 A | 4/1988 | Das | |
| 4,760,735 A | 8/1988 | Sheppard | |
| 4,802,143 A | 1/1989 | Smith | |
| 4,821,563 A | 4/1989 | Maron | |
| 4,958,125 A | 9/1990 | Jardine | |
| 4,958,517 A | 9/1990 | Maron | |
| 5,014,799 A * | 5/1991 | Sato | G01L 5/161 |
| | | | 177/211 |
| 5,193,628 A | 3/1993 | Hill | |
| 5,251,708 A | 10/1993 | Perry | |
| 5,363,095 A | 11/1994 | Normann | |
| 5,386,724 A * | 2/1995 | Das | E21B 47/0006 |
| | | | 175/40 |
| 5,813,480 A | 9/1998 | Zaleski | |
| 5,889,214 A * | 3/1999 | Kang | G01L 5/161 |
| | | | 73/862.043 |
| 6,068,394 A | 5/2000 | Dublin | |
| 6,216,533 B1 | 4/2001 | Woloson | |
| 6,547,016 B2 | 4/2003 | Wassell | |
| 6,684,949 B1 * | 2/2004 | Gabler | E21B 47/0006 |
| | | | 166/250.01 |
| 6,802,215 B1 | 10/2004 | Boucher | |
| 7,743,672 B2 * | 6/2010 | Kurtz | G01L 3/1457 |
| | | | 73/862.041 |
| 7,775,099 B2 | 8/2010 | Bogath | |
| 7,999,695 B2 | 8/2011 | Rodney | |
| 8,087,477 B2 | 1/2012 | Sullivan | |
| 8,291,775 B2 * | 10/2012 | Nagasaka | B25J 13/085 |
| | | | 73/862.041 |
| 8,397,562 B2 * | 3/2013 | Wassell | 73/152.48 |
| 8,525,690 B2 | 9/2013 | Puro | |
| 8,640,791 B2 | 2/2014 | Turner et al. | |
| 8,684,108 B2 | 4/2014 | Turner et al. | |
| 8,727,039 B1 | 5/2014 | Keast | |
| 8,776,615 B2 * | 7/2014 | Kempainen | G01L 5/161 |
| | | | 73/862.043 |
| 9,279,903 B2 | 3/2016 | Wassell | |
| 2002/0070050 A1 | 6/2002 | Wassell | |
| 2005/0109097 A1 | 5/2005 | Bogath | |
| 2011/0024188 A1 * | 2/2011 | Wassell | G01V 11/002 |
| | | | 175/40 |

OTHER PUBLICATIONS

U.S. Appl. No. 09/734,983: Non-Final Office Action dated Apr. 9, 2002.
Response to Written Opinion under Article 34 dated May 27, 2011 in PCT/US2010/043985 APS Technology, Inc. (10 pgs.).
International Search Report and Written Opinion dated Sep. 22, 2010 PCT/US2010/043985 APS Technology, Inc. (10 pgs.).

* cited by examiner

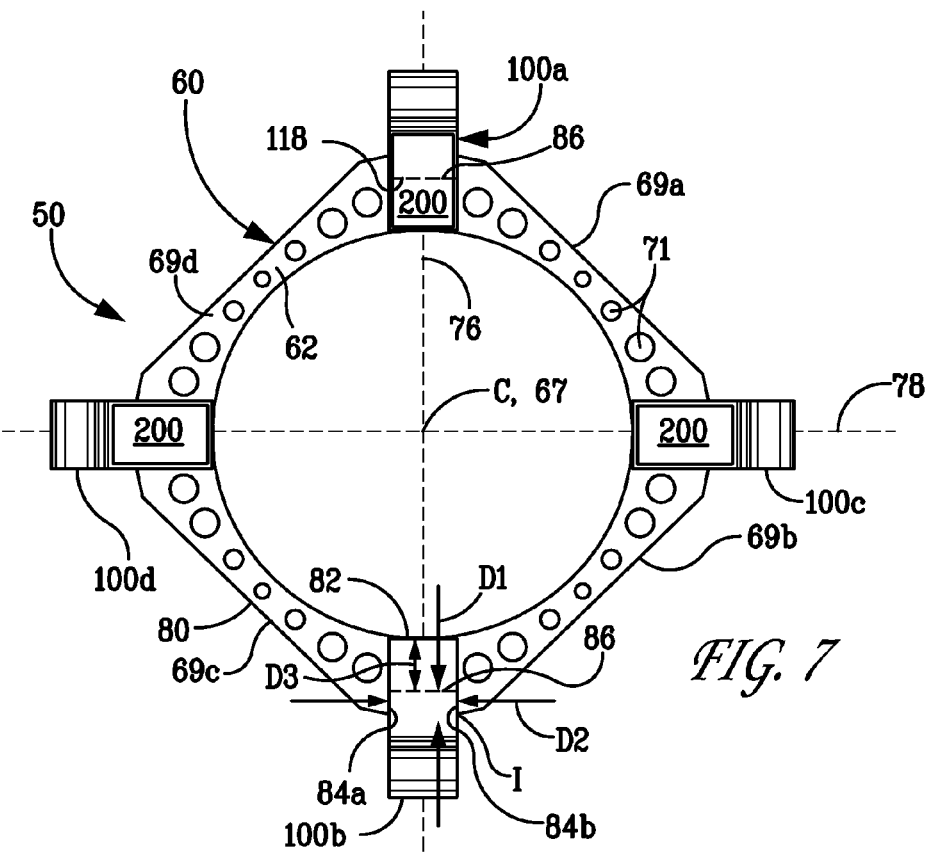
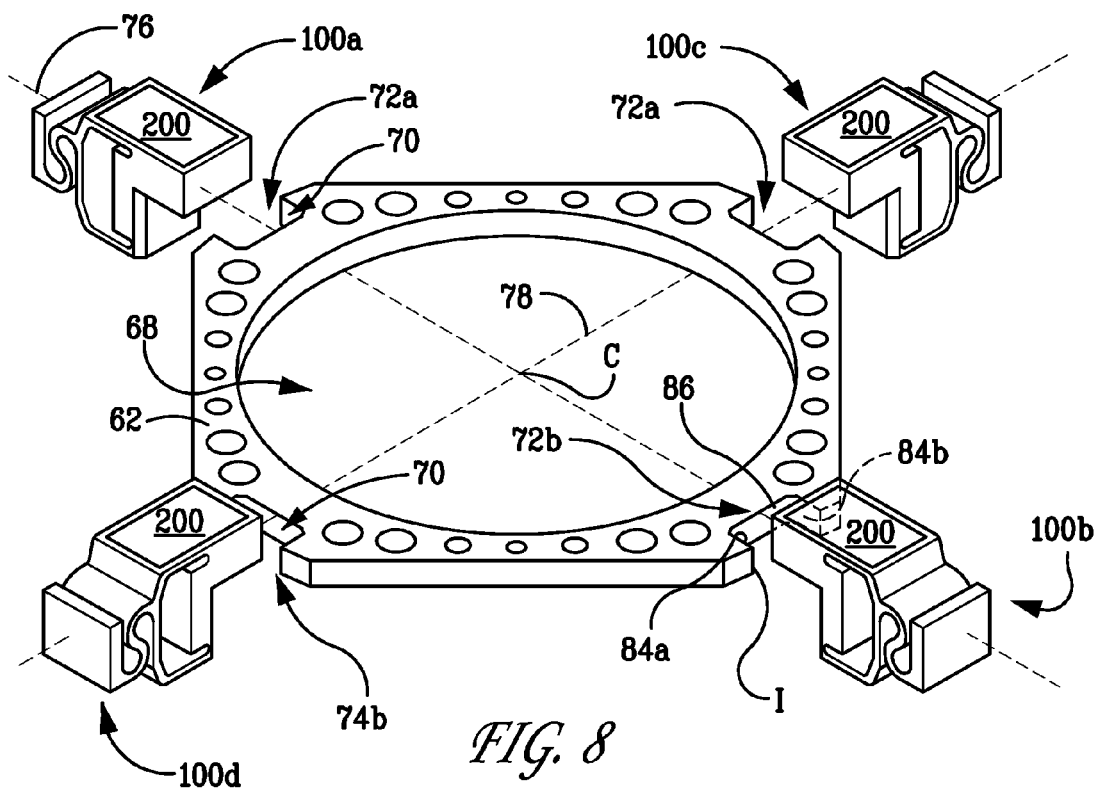

STRAIN SENSOR ASSEMBLY

TECHNICAL FIELD

The present disclosure relates to an apparatus for the detection and measurement of a load applied to a structure, and in particular, to a strain sensor assembly, a method for replacing a strain sensor assembly in a structure subject to the load, and methods for manufacturing such a stain sensor assembly.

BACKGROUND

Strain sensors are used in a wide range of industrial settings for load detection. Strain sensors include multiple strain gauges connected on a circuit typically referred to as a Wheatstone bridge. Such strain sensors may include four strain gauges that define the Wheatstone bridge. A voltage is applied to an input of the circuit or bridge. When a load is applied to the strain sensor, deformation of the strain gauge cause an alternation in resistance across the circuit that is proportional to the load applied to the strain sensor. Thus, the difference in resistance or voltage differential can be transmitted to a computer processor for further processing. Strain gauge design, inter-strain gauge wiring, and voltage amplifiers can limit use of certain strain sensors for applications where limited space is available for a strain sensor. Over time strain sensors need to be replaced due to damage, inoperability or poor measurement accuracy. In use, cyclic loads can degrade electric connections between the strain gauges. Wires corrode. Excessive moisture and temperature fluctuations have a negative impact on the resistive properties of the strain gauges resulting in degraded load detection.

SUMMARY

An embodiment of the present disclosure includes a strain sensor assembly configured for removable placement in a recess of a drill string of a drilling system. The strain sensor assembly comprises a support member configured for placement in the recess, the support member defining an axis. The strain sensor includes at least one pair of opposed strain gauge members that extend from the support member. The pair of strain gauge members spaced apart from each other along the axis, each strain gauge member defining a support portion carried by the support member and a biasing portion that extends from the support portion along the axis. The support portion includes at least one strain gauge sensor. The biasing portion is configured to bias against a wall of the recess of the drill string when the strain sensor is disposed in the recess, wherein the strain sensor assembly is configured such that the at least a pair of strain gauge members form an interference fit with the wall of the recess when the strain sensor assembly is inserted in the recess.

According to another embodiment of the present disclosure includes a drill string component of a drill string configured to drill a borehole into an earthen formation, the drill string component being elongate along a central longitudinal axis. The drill string component includes a drill string component body having at least one recess and at least one wall extending along a transverse direction that is substantially perpendicular to the longitudinal axis. The at least one wall at least partially defining the at least one recess. At least one strain sensor assembly can be removably positioned in a respective one of the at least one recess. The at least one strain sensor assembly configured to measure a force applied to the drill string, wherein the at least one strain sensor assembly is configured to bias against the at least one wall so as to form an interference fit in the at least one recess.

Another embodiment of the present disclosure includes a strain sensor assembly configured to detect one or more of forces applied to a structure having a recess. The structure can be structure subject to a load and is not limited specifically to a drill string component. The strain sensor assembly includes a support member defining an axis and at least a pair of opposed strain gauge members that extend from the support member. The at least a pair of strain gauge members spaced apart along the axis, each strain gauge member defining a support portion carried by the support member and a biasing portion that extends from the support portion along the axis. The support portion includes at least one strain gauge sensor. The biasing portion configured to bias against a wall of the recess of the structure when the strain sensor assembly is disposed in the recess, wherein the strain sensor assembly is configured such that the at least a pair of strain gauge members form an interference fit with the wall of the recess when the strain sensor is inserted in the recess.

Another embodiment of the present disclosure, which can be part of any aforementioned embodiments or the methods noted below, includes a strain gauge member. The strain gauge member includes a strain gauge member body defining a first axis. The strain gauge member body includes a first end, a second end spaced from the first end along the first axis, a first surface, and a second surface opposed to the first surface along a second axis that intersects and is perpendicular to the first axis. The body is configured so that when a force is applied to the strain gauge member body along the first axis a tensile compressive stresses are concentrated along at least one plane defined by the body that is substantially parallel to the first axis. In another embodiment the at least one plane can be defined by a respective one of the first and second surfaces.

Another embodiment of the present disclosure includes a method of replacing a strain sensor disposed on a structure. The method comprises the steps of removing a first sensor assembly from a recess of the structure, the structure including at least one wall that at least partially defines the recess, and placing a second sensor assembly into the recess of the structure such that the second sensor forms an interference fit with the at least one wall of the recess. The method includes the step of forming an electronic connection between the second recess and electronic components supported by the structure.

Another embodiment of the present disclosure includes a method of manufacturing a strain sensor. The method comprises the steps of forming at least one strain gauge member, the at least one strain gauge member having a support portion and a biasing portion. The method includes forming at least one strain sensor on the support portion. The method also includes attaching the at least one strain gauge member to a support member.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings:

FIG. 7 is a top plan view of a strain sensor assembly, according to an embodiment of the present disclosure;

FIG. 8 is an exploded perspective view the strain sensor assembly shown in FIG. 7;

DETAILED DESCRIPTION OF ILLUSTRATIVE EMBODIMENTS

Figure 1:
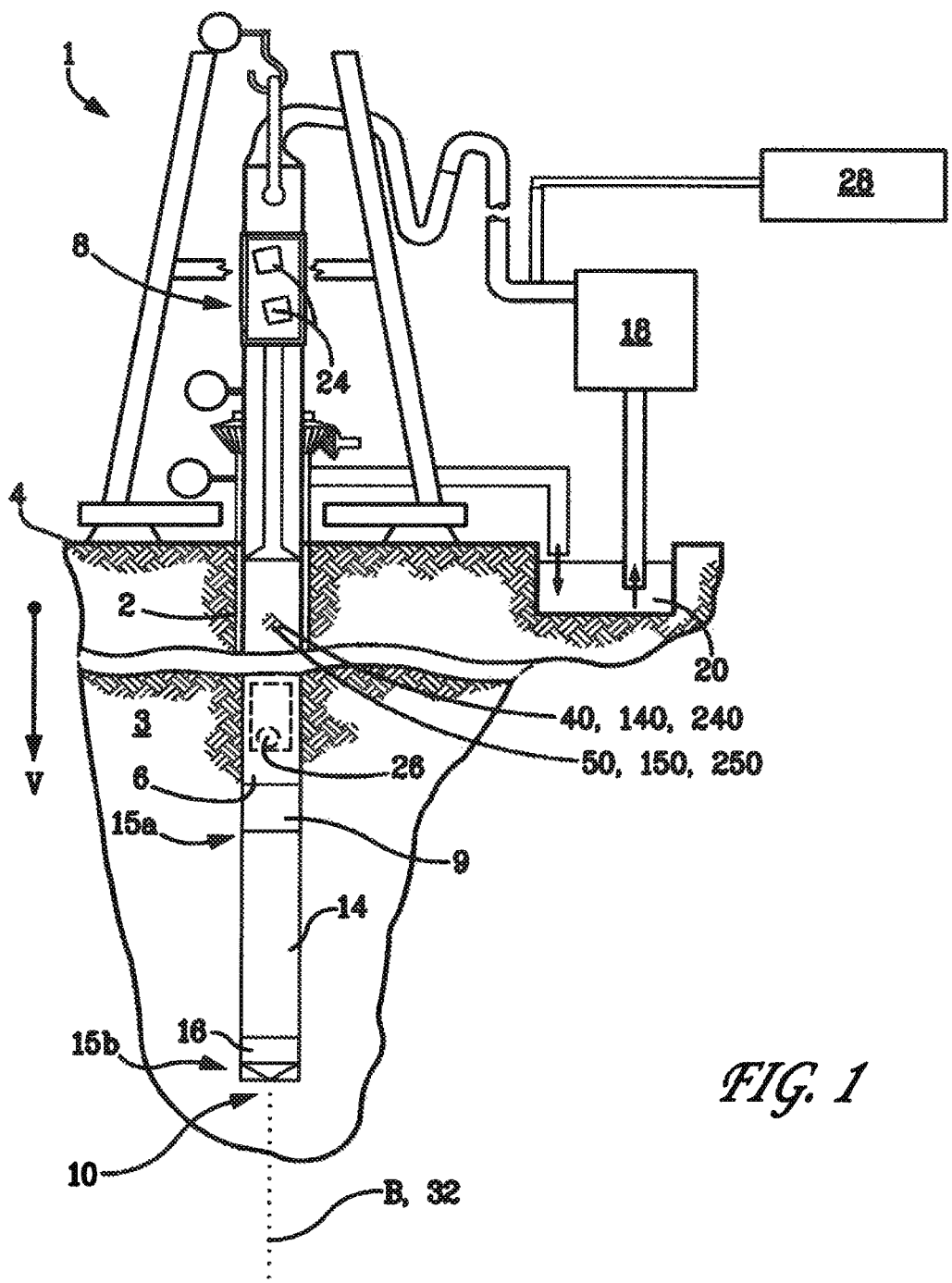
FIG. 1 is a schematic of an industrial system, for instance an underground drilling system, according to an embodiment of the present disclosure.

Referring initially to FIGS. 5-8, an embodiment of the present disclosure is a strain sensor assembly 50 configured for removable placement in a recess of a structure that is subject to load, for instance axial, lateral and torsional loads, as will be further detailed below. A "structure" as used herein can be any member subject to such loads, such as a drill string in a drilling operation. The structure can define a wall that defines the recess. In one embodiment, the strain sensor assemblies may be referred to as a replaceable strain sensor assembly 50. While the strain sensor assembly 50 is described below in conjunction with a drilling system (FIG. 1), the strain sensor assembly 50 can be used in other industrial settings, such as medical instrumentation, automotive applications, pressure measurement, material testing, e.g., load cells, aerospace applications, e.g., aircraft structures, nacelles, pylons, wings, rocketry, or any other rough-service applications where high loads and excessive or fluctuating temperatures are possible. The strain sensor assembly can also be used in agriculture applications, such as load detection in grain silos, or in applications where a structure, such as a slab material is subjected to high loads in harsh environmental conditions.

The strain sensor assembly 50 includes support member 60 and a plurality of strain gauge members 100 that are supported by, for instance attached, to the support member 60. Each strain gauge member 100 includes a strain gauge sensor 200 as further detailed below. The strain sensor assembly 50 can have, for instance, a pair of strain gauge members, or up to and including four strain gauge members 100a, 100b, 100c and 100d. The strain gauge members 100a, 100b, 100c, and 100d extend out (preferably radially outwardly) from the support member 60 and are configured to apply a biasing force against the wall of a recess of the structure such that the strain sensor assembly 50 forms an interference fit with the recess wall. The strain sensor assembly 50 is thus configured to be held in place in the recess without the use of fasteners and/or bonding agents. The interference fit allows for simple and efficient removal of the strain sensor assembly 50 when needed, for instance, when the strain sensor is damaged or when the strain sensor assembly 50 load detection capability has diminished to an unacceptable level. When the strain sensor assembly 50 includes only a pair of strain gauge members (FIGS. 14A and 14B), multiple strain sensors (FIG. 15) can be used for load detection.

In accordance with the illustrated embodiment, the strain gauge members 100a, 100b, 100c, 100d can include stress risers that magnifying the tensile and compressive stress applied across the strain gauge member 100, and thus magnify any resistance change caused by the application of the load to each strain gauge member 100. In particular, the strain gauge member 100 is configured so that when load is applied along a direction that is normal to an end 101a (FIG. 11) of the strain gauge member 100, tensile and compressive stress concentrations are created along a plane that is parallel to the direction in which the load is applied, which is an unexpected result. In accordance with such an embodiment, the strain gauge member 100 can be used in the strain sensor assembly 50 for compact or low space applications. Further, in certain embodiments, the strain sensor assembly 50 is configured such that voltage amplification is not required for adequately detecting, measuring and transmitting accurate load data, as will be further detailed below. Thus, the strain gauge members are configured to reduce the number of components and overall size of the strain sensor 50. It can be said that the strain sensor can be configured to have a compact design. While voltage amplification is not a requirement, voltage amplifiers (not shown) may be used as needed.

Turning to FIG. 1, according to the illustrated embodiment, the strain sensor assembly 50 is configured for use in an underground drilling system 1 configured to drill a borehole 2 in an earthen formation 3 along a borehole axis B. The drilling system 1 includes a drill string 6 configured to drill the borehole 2 such that the borehole axis B extends along a vertical direction V. The vertical direction V refers to a direction that is perpendicular to the surface 4 of the earthen formation 3. It should be appreciated that the drill string 6 can be configured for directional drilling, whereby all or a portion of the borehole 2 is angularly offset with respect to the vertical direction V.

Continuing with FIG. 1, the drilling system 1 includes a derrick 5 that supports the drill string 6. The drill string 6 is elongate along a central longitudinal axis 32 and includes a top end 8 and a bottom end 10 spaced from the top end 8 along the central longitudinal axis 32. The drill string 6 includes several drill string components. The drill string components include a top sub (not numbered) at the top end 8 of the drill string 6, drill pipe 9, a bottomhole assembly 14 positioned toward the bottom end 10 of the drill string 6, and a drill bit 16. In addition, the drill string components can also include one or more drill collars positioned adjacent to the bottomhole assembly 14 and/or drill bit 16. One or more drill collars can be disposed along any portion of the drill string 6. The bottomhole assembly 14 includes a top end 15a and a bottom end 15b spaced from the top end 15a along the central longitudinal axis 32. The drill bit 16 is coupled to the bottom end 15b of the bottomhole assembly 14 for drilling the borehole 2 as the drill string is advanced through the earthen formation 3. Further, in a directional drilling configuration, the drill string 6 can include a bent sub (not shown) for directing the drill bit 16 in a direction that is offset from the vertical direction V.

The drilling system 1 includes one or more motors, such as a top drive or rotary table, configured to rotate the drill string 6 so as to control the rotational speed (RPM) of, and torque on, the drill bit 16. The one or more motors can rotate the drill string 6 and drill bit 16 to define the borehole 2. A pump 18 is configured to pump a fluid 20, for instance drilling mud, downward through an internal passage 7 (FIG. 3) in the drill string 6. When the drilling mud 20 exits the drill string 6 at the drill bit 16, the returning drilling mud 20 flows upward toward the surface 4 through an annular passage (not shown) formed between the drill string 6 and the borehole 2 in the earthen formation 3. Mud motors can rotate the drill bit 16 independent of the rotation of the drill string 6.

The drilling system 1 includes a plurality of sensors 24 for obtaining drilling data for monitoring and control of the drilling operation. The sensors can be disposed or configured for use with any of the drill string components. The plurality of sensors can be downhole sensors located on the drill string 6 or surface sensors located at the surface 4. One or more of the plurality of sensors can be the strain sensor assembly 50, 150, 250 as described herein.

The drilling system 1 can also include at least one computing device 28, a communication system, and at least one communication module 26 supported by the drill string 6. The at least one computing device 28 can host one or more applications that are configured to perform various methods for analyzing, monitoring, and/or controlling operation of the drilling system 1. The communication module 26 can be disposed downhole on drill string 6 and is configured to transmit data obtained from the sensors to the computing device 28 via the communication system. For instance, the strain sensor assembly 50, 150 and 250 can be electronically connected to the communication module 26. Detected load data can be transmitted from the communication module 26 (FIG. 2) to the computing device 28 (FIG. 1) via the communication system. For instance, load data can be transmitted via wires in a wired pipe implementation. Alternative data transmission methods include wireless telemetry as disclosed in Puro U.S. Pat. No. 8,525,690 issued Sep. 3, 2013, entitled "Synchronized Telemetry From A Rotating Element," hereby incorporated by reference in its entirety. Other alternatives include mud pulse telemetry, acoustic or electromagnetic data transmission systems.

Figure 2:
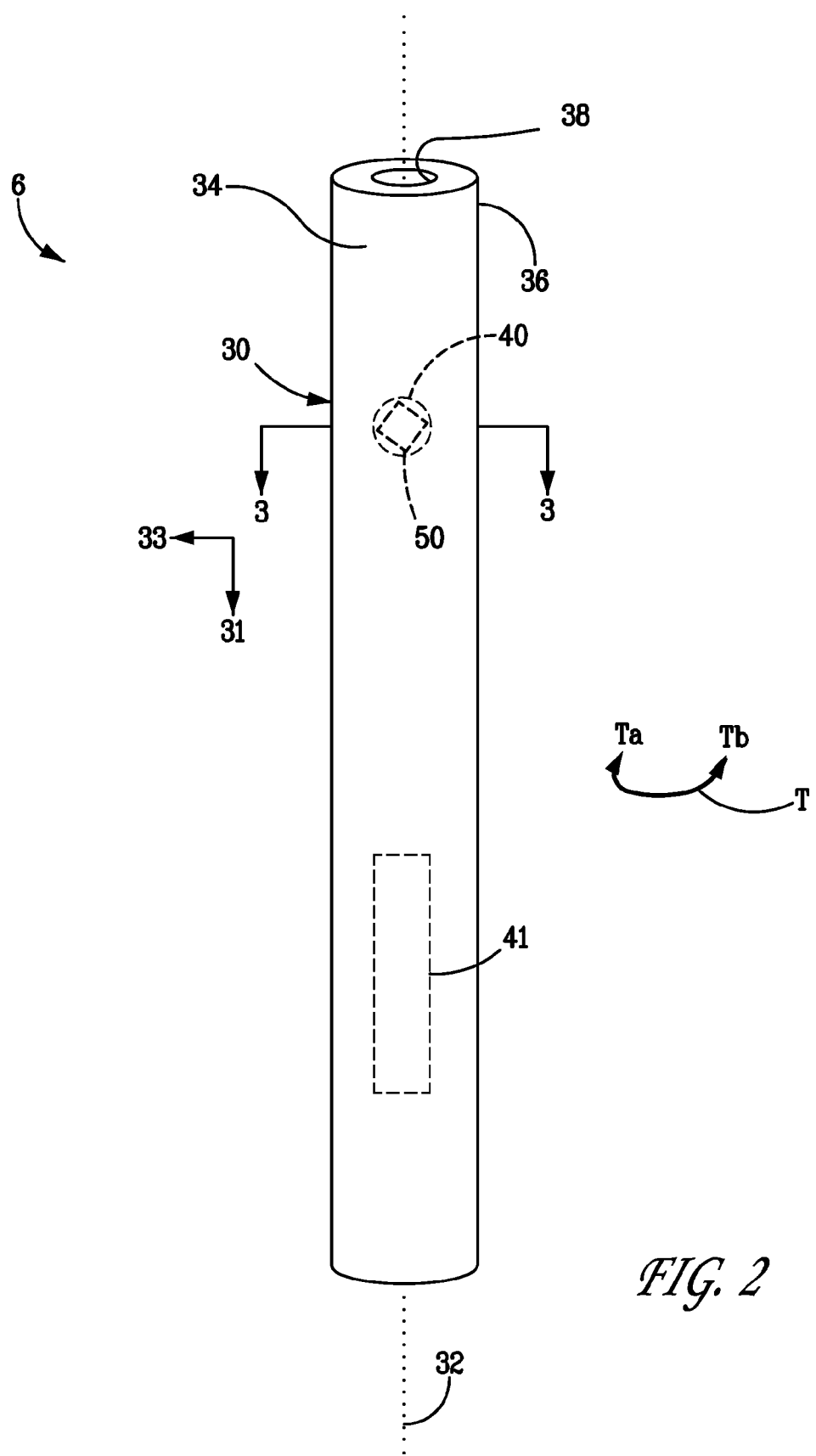
FIG. 2 is a perspective view of a portion of a structure subject to one or more loads, such as a drill string in the underground drilling system shown in FIG. 1.
Figure 3:
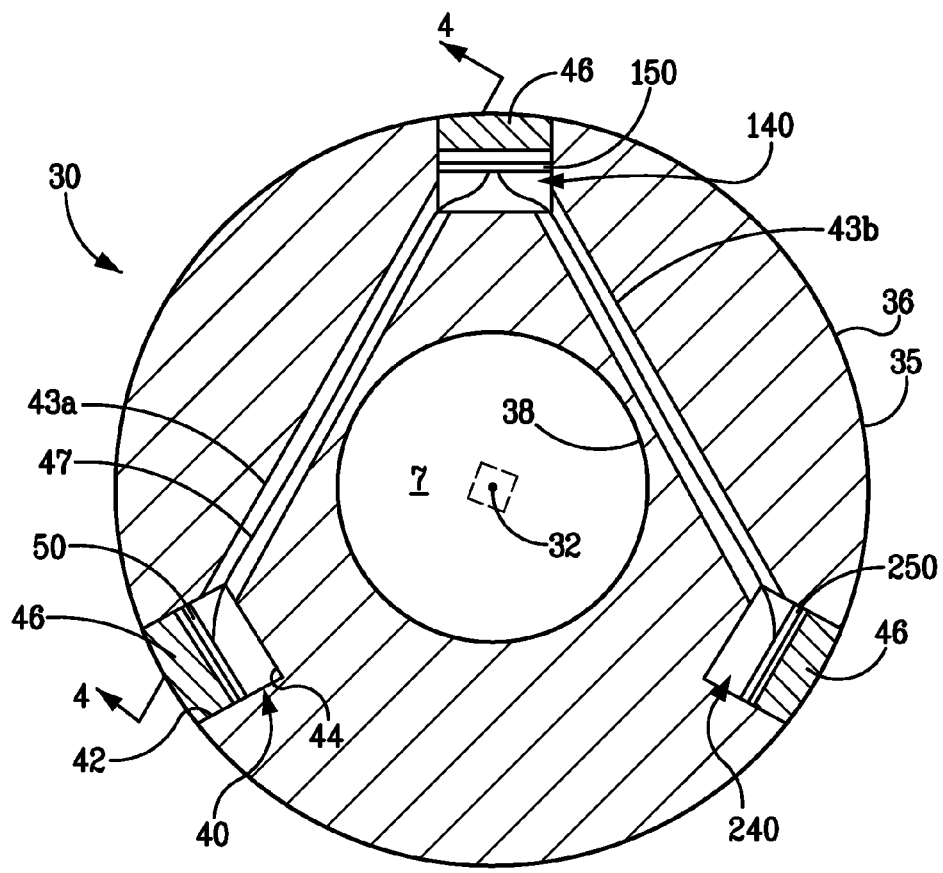
FIG. 3 is a cross-sectional view of the drill string taken along lines 3-3 in FIG. 2.
Figure 4:
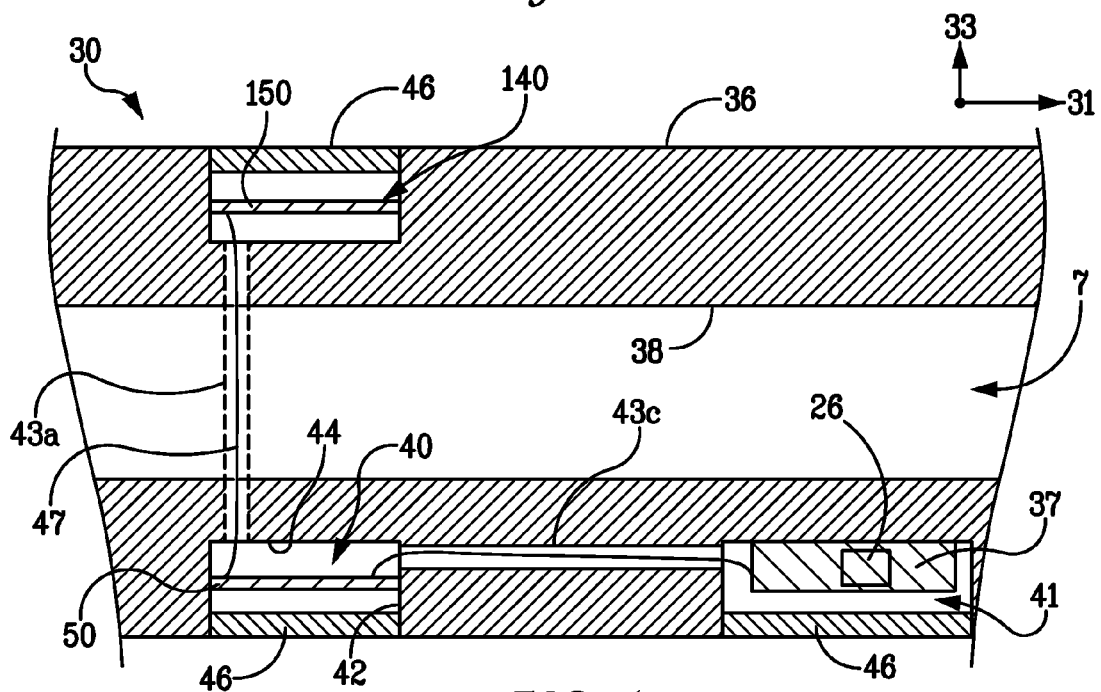
FIG. 4 is a side cross-sectional view of a portion of the drill string taken along line 4-4 in FIG. 3, illustrating a plurality of strain sensors disposed in recesses of the drill string.

Referring to FIGS. 2-4, the drill string 6 includes one or more drill string components 30 described above. The drill string 6 extends along the central longitudinal axis 32 such that the each drill string component 30 can include a drill string component body 34 that is elongate along the central longitudinal axis 32. Thus, the drill string component 30 can extend along a longitudinal direction 31 that is aligned with the central longitudinal axis 32. The drill string component body 34 defines an outer surface 36 configured to face the earthen formation 3 and an inner surface 38 that is spaced from the outer surface 36 along a radial direction 33 that is substantially perpendicular to the longitudinal direction 31. The inner surface 38 defines the internal passage 7 of the drill string 6.

One or more of drill string components 30 include at least one recess 40, for instance a plurality of recesses, sized and configured to receive the strain sensor assembly 50. The drill string component body 34 defines a recess side wall 42 that extends from the outer surface 36 along the radial direction 33 and a recess inner wall 44 that is spaced from the outer surface 36 along the radial direction 33. The recess side wall 42 and the recess inner wall 44 at least partially define the recess 40. Each recess 40 can include a cap 46 that is sized to cover or fit at least partially in the recess 40. The cap 46 can be used to cover and protect the contents of the recess 40.

Continuing with FIGS. 2-4, the drill string component 30 can include the one or more recesses, such as a first recess 40, a second recess 140 and a third recess 240, as noted above. Each recess 40, 140, and 240 can be circumferentially spaced apart with respect to each other along an outer perimeter 35 of the drill string component body 34. Further, the first recess 40, second recess 140, and third recess 240 are disposed along a common plane (not shown) that is perpendicular to the central longitudinal axis 32 and extends through the drill string component body 34. It should be appreciated that the recesses 40, 140, 240 can be formed along any portion of the drill string component body 34. The drill string component 30 can also include an additional recess 41 sized and configured to receive electronic components 37, for instance the communication module 26, an electronic data recorder (not numbered) supported by one or more circuit boards. The drill string component body 34 further defines at least first, second and third channels 43a, 43b, and 43c that extend between and connect pairs of recesses 40, 140, 240, and 41. For instance, the first channel 43a extends from the first recess 40 to the second recess 140, and the second channel 43b extends from the second recess 140 to the third recess 240. The third channel 43c extends from the first recess 40 to the recess 41. Each channel 43a, 43b, and 43c is configured for route wires 47 that interconnect the strain sensor assemblies 50 sensor assemblies 50, 150, 250 located in the respective recesses 40, 140, 240 with components located in the recess 41, such as the communication module 26.

Figure 5:
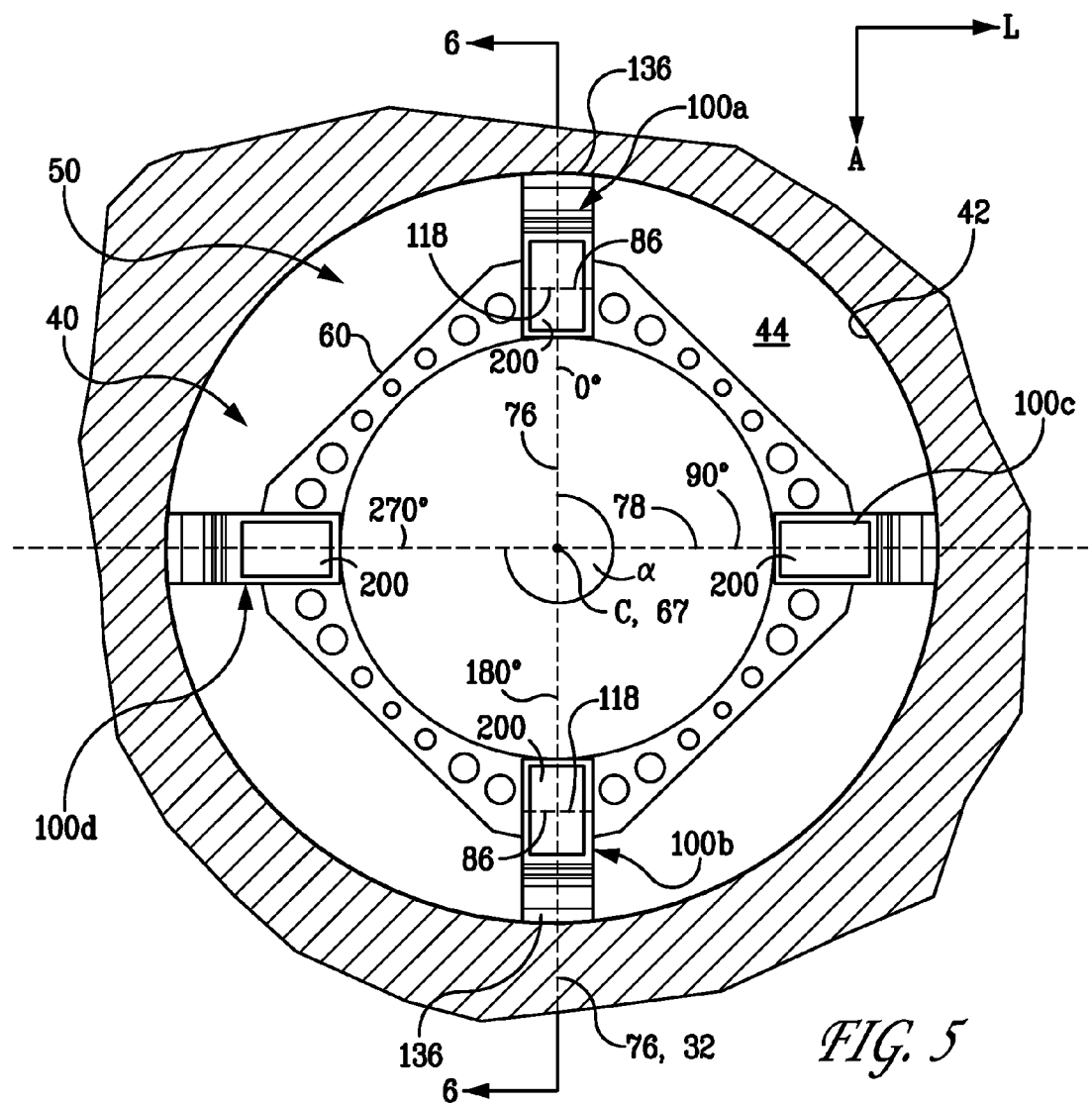
FIG. 5 is a side view of a strain sensor assembly disposed in a recess of a drill string shown in FIG. 2, with a cap removed to illustrate the strain sensor assembly having an interference fit within a recess.
Figure 6:
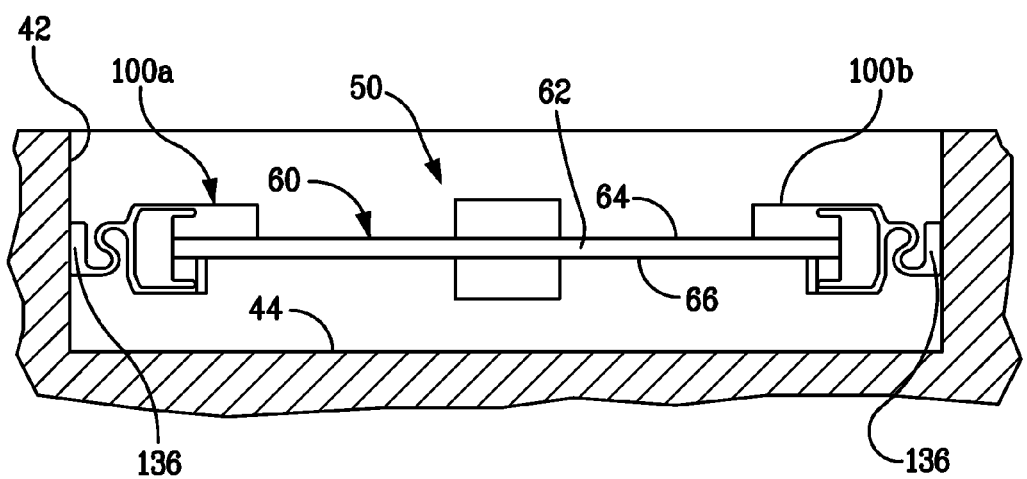
FIG. 6 is a cross-sectional view of the strain sensor assembly in a recess taken along line 6-6 in FIG. 5.

Turning to FIGS. 5 and 6, the strain sensor assembly 50 is configured for removable placement in the recess 40. While the strain sensor assembly 50 will be described with reference to the drilling system 1, it should be appreciated that the strain sensor assembly 50 can be positioned within a recess of any structure subject to a load.

Figure 14A:
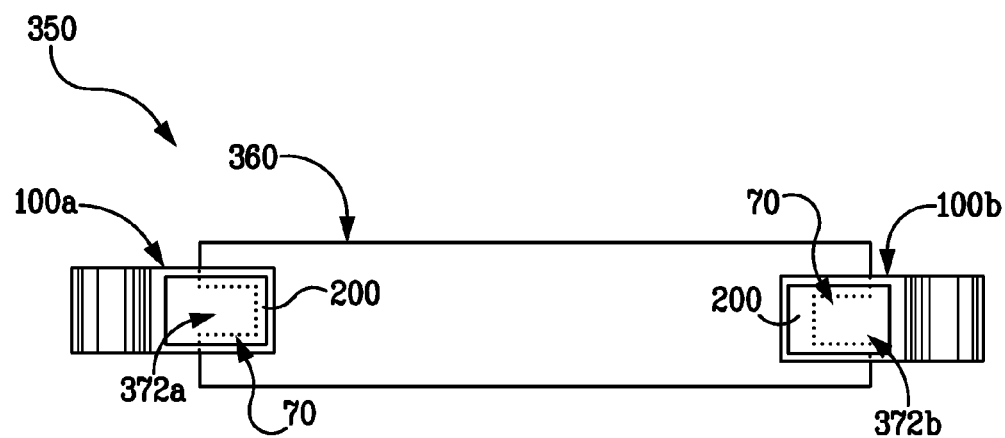
FIG. 14A is a top plan view of a strain sensor assembly, according to another embodiment of the present disclosure.
Figure 14B:
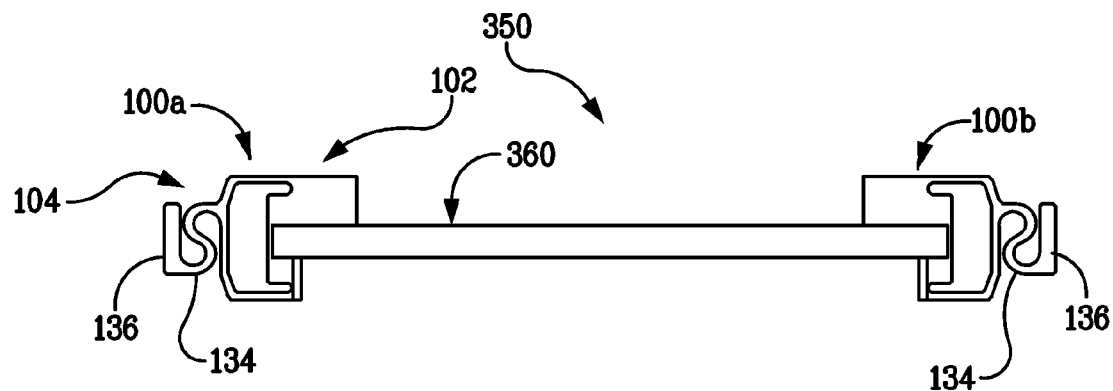
FIG. 14B is side elevation view of the strain sensor assembly shown in FIG. 10.

The strain sensor assembly 50 includes a support member 60 and a plurality of strain gauge members 100 supported by, for instance attached to, the strain sensor assembly 50. As noted above, the strain gauge members 100a, 100b, 100c and 100d (or a pair of strain gauge members 100a and 100b) extend out from the support member 60 to apply a biasing force against the wall of the recess such that the strain sensor assembly 50 forms an interference fit with the recess wall. In accordance with the illustrated embodiment, the support member 60 defines a support member body 62 that includes an upper surface 64 and an opposed lower surface 66 spaced from the upper surface 64 along a support member central axis 67. The support member body 62 includes four side portions 69a, 69b, 69c, and 69d. Opposing pairs of the side portions 69a . . . 69d are equidistantly spaced from the support member central axis 67 such that the support member central axis 67 extends through a geometric center C of the support member 60. The support member body 62 also includes a central opening 68 that extends through the support member body 62 along the support member central axis 67. The central opening 68 can be circular and is coaxial with the support member central axis 67 and center C. In the illustrated embodiment, the support member body 62 defines a ring shape. While a ring shape is illustrated, it should be appreciated that the support member body can define a circular, oval, or square shaped plate, i.e. without a central opening. In other alternative embodiments, the support member body 62 can define a rectilinear shape configured to support a pair of strain gauge members (FIGS. 14A and 14B). The support member body also defines a plurality of holes 71 that extend from the upper surface to the lower surface through the body. The plurality of holes 71 reduce the overall mass of the support member body, can be used to help orient sensor in the recess and may be used as wire passageways.

As shown in FIGS. 7 and 8, the support member body 62 includes a plurality of notches 70, such as at least two notches, each configured to receive a respective strain gauge member 100. The plurality of notches includes a first pair of notches 72a and 72b and a second pair of notches 74a and 74b. The first pair of notches 72a and 72b are aligned along a first axis 76 that is perpendicular to the support member central axis 67. The second pair of notches 74a and 74b are aligned along a second axis 78 that is perpendicular to the first axis 76 and the support member central axis 67. The first, second and central axes 76, 78, and 67, respectively, can intersect at the common intersection point, such as the center C. As will be further detailed below, the orientation of the strain sensor assembly 50 in the respective recess determines how the respective first and second axes 76 and 78 align with longitudinal axis 32 of the drill string 6. The support member body 62 (FIG. 8) defines an outer side wall 80 that extends from the upper surface 64 to the lower surface 66 and an opposed inner wall 82. The inner wall 82 at least partially defines the central opening 68. The outer and inner walls 80 and 82 can have a thickness that is less than a width of the upper and lower surfaces 64 and 66 of the support member.

Continuing with FIGS. 7 and 8, the support member body 62 further defines, for each respective notch, a pair of notch side walls 84a and 84b and an abutment wall 86. The notch side walls 84a and 84b extend from the outer wall 80 along respective first and second axes 76 and 78 toward the abutment wall 86. The outer walls 80 intersect notch sides walls 84a and 84b at an intersection I. The abutment wall 86 is opposed to and spaced from the inner wall 82. Accordingly, the notch 70 has a first dimension D1 (FIG. 7) defined as the distance from the intersection I to the abutment wall 86 along a direction that is aligned with the axis 76. The notch 70 can have a second dimension D2 defined as the distance that extend from notch side wall 84a to notch side wall 84b along an axis (not shown) that is perpendicular to axis 76. The support member body 62 can define a third dimension D3 (FIG. 7) that is the distance from the abutment wall 86 to the inner wall 82 along the respective first and second axes 76 and 78. The first, second and third dimensions are D1, D2, and D3 are selected so as to receive similarly dimensioned portions of the strain gauge member 100 as will be detailed below. It should be appreciated that the configuration of the notch 70 can vary based on the design of the strain gauge member 100. For instance, the notch can have curvilinear portions. In other embodiments, the notch can be a plurality of spaced apart slots that extend into the support member body 62. In still other embodiments, the notches can be defined by at least one of the upper and lower surfaces of the support member body 62. In still other alternative embodiments, the support member body 62 may not have notches.

The support member 60 is rigid so as to assist positioning the strain sensor in the recess 40 and is yet configured to such that loads applied the structure over a range of operating conditions can be transferred between the structure and the support member. In a preferred embodiment, the support member 60 is made of a material that will match or at least possess a similar coefficient of thermal expansion as the material of the recess structure. The support member 60 is preferably made of metallic materials such as metallic-alloys, stainless steel, titanium, nickel, non-ferrous alloys, and/or metal matrix composites. For instance, the support member 60 can be made of steel alloy, such as Inconel, P550, 17-4 PH. In alternative embodiments, the support member can be formed of any metallic or polymeric materials or metallic/polymeric composites whereby the coefficient of thermal expansion matches or is similar to the coefficient of thermal expansion of the structure to which the strain sensor is attached. The support member can be machined using CNC, additive manufacturing, casting, electric discharge machining (EDM), alloy composite fabrication, turning, or similar fabrication techniques. The support member can be monolithic or it can be formed of multiple parts assembled together.

In accordance with the illustrated embodiment, the plurality of strain gauge members 100 include a first pair of opposed strain gauge members 100a and 100b that extend from the support member 60 along the first axis 76, and a second pair of opposed strain gauge members 100c and 100d that extend from the support member 60 along the second axis 78. When the strain sensor assembly 50 is placed in the recess 40 of the drill string component 30, the first and second axes 76 and 78 are aligned with respective first and second directions of force application F. The direction of force application refers to direction along which the drill string component is subject to a load. For drilling operations, axial, lateral and torsional loads are applied to the drill string 6 during drilling and thus the strain sensor assemblies are configured, and positioned in the drill string 6, to measure the respective axial and torsional loads as described above. Along a lateral direction, the Poisson effect due to actual load is measured. Thus, as shown in FIG. 2, the direction of force application as used herein can be an axial direction of force application A, a lateral direction of force application L, and a torsional direction of force application T. Further, each direction of force application (A, L or T) can have a first directional component and the second directional component that is opposite to the first directional component. When the strain sensor assembly 50 is placed in the recess 40 such that the first axis 76 is aligned with the central longitudinal axis 32 of the drill string 6, an angle α defined between the first axis 76 and the central axis 32 is 0 (zero) (or 180 degrees) and the angle α defined between the first axis 78 and the central axis 32 is 90 degrees (or 270 degrees). Thus, the strain gauge members 100a and 100b are axially oriented so as to detect a maximum principal strain along the axial direction of force application A, while the strain gauge members 100c and 100d are laterally orientated so to detect a transverse Poisson strain caused by a force application A. The lateral direction of force application L, which is the direction that a lateral load is applied to the drill string 6, is perpendicular to the central longitudinal axis 32. During a drilling operation a torsional load causes an up hole portion of the drill string 6 to twist relative to a downhole portion of the drill string 6 such that a load is applied generally across the central longitudinal axis of the drill string 6. Thus, the torsional direction of the force application T refers to the first and second rotational directions Ta and Tb that a torsional load could be applied to the drill string 6. Bending loads, and their direction, can be derived from multiple strain readings in the same plane.

The strain sensor assembly 50 is configured to be positioned in the recess 40 in any direction or orientation so as to detect a load. If the strain sensor assembly 50 is configured to detect axial loads, the strain sensor assembly 50 is positioned in the recess so that the first axis 76 (or second axis 78) is aligned with the axial direction of force application A. In other words, the first axis 76 would be aligned with central longitudinal axis 32 of the drill string 6. Accordingly, for a strain sensor assembly that has four strain gauge members 100a . . . 100d, the strain sensor assembly 50 is aligned with both the axial direction of force application A and the lateral direction of force application when the first axis 76 (or second axis 78) is aligned with the central longitudinal axis 32 of the drill string 6. When two or three such strain sensor assemblies 50 are positioned in two or three such recesses (40, 140, 150) that are radially disposed at equal angles about the circumference of any drill string component 30 and in the same horizontal plane, bending loads may also be detected.

According to an embodiment of the present disclosure, the torsional load may be detected when a strain sensor assembly 50 is placed in the recess and offset at about 45 degrees with respect to the axial direction of force application A. In a drilling system as noted above, the axial direction of force application A is aligned with the central axis 32. Accordingly, to detect torsional loads, the strain sensor assembly 50 is placed in the recess 40 (or 140, 150) so that the strain gauge members 100a and 100b are positioned such that the angle α defined between the first axis 76 and the central axis 32 is 45 degrees (or 225 degrees). In such an embodiment, strain gauge members 100c and 100d are positioned in recess 40 (not shown) such that the angle α defined between the first axis 76 and the central axis 32 is 135 degrees (or 315 degrees) in accordance with another embodiment, a pair of strain sensor assemblies can positioned in one or more recess 40 so as to detect torsional loads. For instance, a pair strain sensor assemblies 50 may placed in single recess 40. In such an embodiment, the first strain sensor assembly of the pair is oriented in a first recess 40 so that the pair of the strain gauges are aligned along the central longitudinal central axis 32 so as to measure an axial load. The other strain sensor assembly of the pair of strain sensors can be placed in a second recess 140 so that the pair of strain gauges are offset from the central longitudinal axis at about 45 degrees so as to measure a torsional load.

Figure 9:
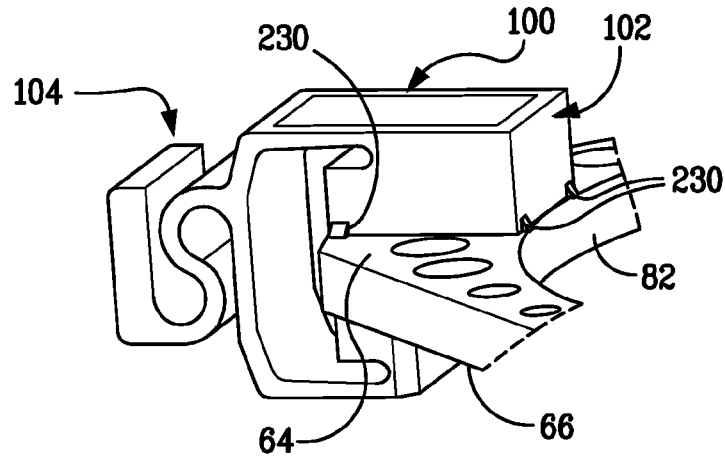
FIG. 9 is a perspective view of a portion of the strain sensor assembly shown in FIG. 7.
Figure 10:
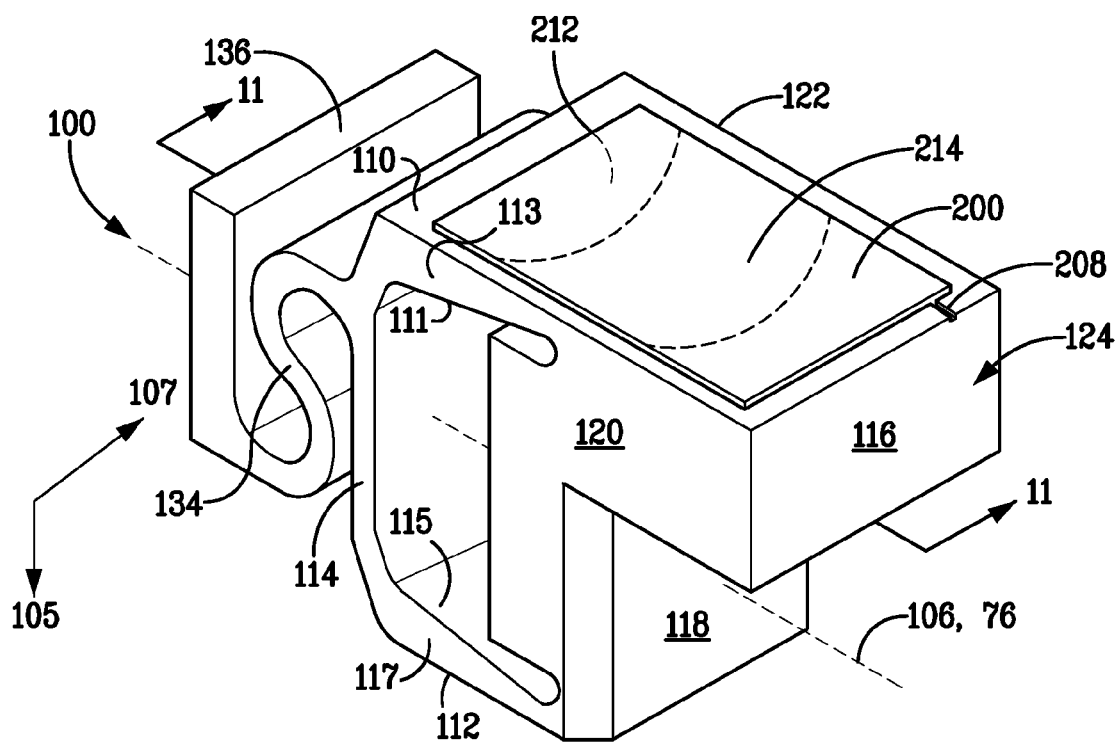
FIG. 10 is a perspective view of a strain gauge member of the strain sensor assembly shown in FIG. 7.
Figure 11:
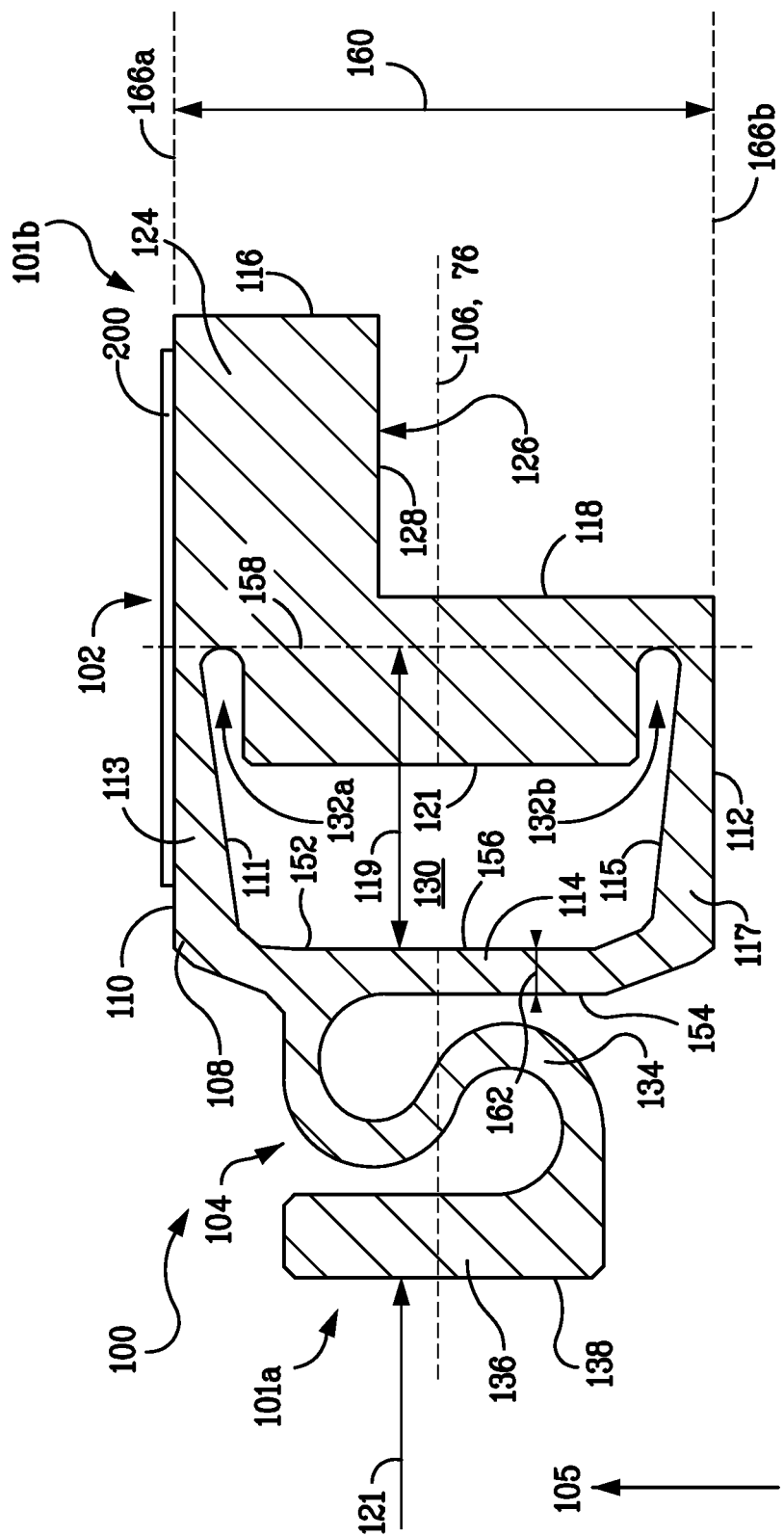
FIG. 11 is a cross-sectional view of the strain gauge member taken along line 11-11 in FIG. 10.

Continuing with FIGS. 9, 10 and 11, each strain gauge member 100 includes a support portion 102 and a biasing portion 104 that extends from the support portion 102 along a strain gauge member axis 106. The strain gauge member 100 can have a first end 101a that is defined by the biasing portion 104 and a second end 101b that is defined by the support portion 102. In accordance with the illustrated embodiment, the strain gauge member axis 106 can be aligned with direction of force application when the strain gauge member 100 is attached to the support member 60. Accordingly, the strain gauge member axis 106 is aligned, for instance coaxial, with the first axis 76 or the second axis 78. For ease of illustration, the strain gauge member 100 will be described with reference to the first axis 76. The biasing portion 104 is configured to bias against the recess side wall 42 of the drill string component 30 when the strain sensor assembly 50 is placed inside the recess 40, such that the strain sensor assembly 50 has an interference fit with the recess side wall 42. In particular, when strain sensor assembly 50 is inserted in the recess 40 the first pair of strain gauge members 100a and 100b form an interference fit with the recess side wall 42 and the second pair of strain gauge members 100c and 100d form an interference fit with a different portion of the recess side wall 42.

The support portion 102 includes a support wall 114, a support plate 124 and a pair of bending walls 113 and 117 that extend from support wall 114 toward the support plate 124. The first bending wall 113 connects the support wall 114 to the support plate 124. The second bending wall 117 connects the support wall 114 to the support body portion (not numbered) below the support plate 124. The bending walls 113, 117 and support plate 124 extend along the axis 106 in a direction away from the support wall 114 and the biasing portion 104. In accordance with the illustrated embodiment, the strain gauge member body 108 defines an upper surface 110, a lower surface 112 spaced from the upper surface 110 along a vertical direction 105 that is substantially perpendicular to the axis 106. The support wall 114 extends between the upper and lower surfaces 110 and 112, and includes an outer transverse surface 154 and an opposed inner transverse surface 156. The body 108 includes first and second transverse surfaces 116 and 118 that are spaced from and opposite the support wall 114 along the axis 106. The first bending wall 113 and a second bending wall 117 extend between and connect the support wall 114 to the support plate 124.

The support plate 124 can carry the strain sensor 200 along the upper surface 110 and also connect to the support member 60 along a contact surface 128 that is opposite a portion of the upper surface 110. The support plate 124 be defined by opposed side walls 120 and 122 along the vertical direction 105. The support plate 124 also defines a ledge 126 that includes the contact surface 128 spaced from the upper surface 110 along the vertical direction 105. The contact surface 128 is configured to engage with the upper surface 64 of the support member 600 The support plate 124 defines at least a portion of the upper surface 110, the first transverse surface 116, the second transverse surface 118. The second transverse surface 118 is configured to engage the abutment wall 86 of the support member 60. The support member abutment wall 86 can be referred to as the first abutment surface 86 and the second transverse surface 118 can be referred to as a second abutment surface 118. The support plate 124 can define a groove 208 for relieving a wire.

The body 108, and in particular the first bending wall 113 includes a first inner surface 111 opposed to the upper surface 110. The second bending wall 117 includes a second inner surface 115 opposed to the lower surface 112. The body 108 also includes a wall 121 facing and opposite the inner transverse surface 156. The wall 121 is defined by the support body portion (not numbered) that extends between the slots 132a and 132b. The inner transverse surface 156, first inner surface 113, wall surface 121, and second inner surface define a body inner surface 152. The body 108, for instance the body inner surface 152, defines a cavity 130 that extends along a transverse direction 107 between the side wall 120 and 122. The transverse direction 107 is substantially perpendicular to the axis 106 and the vertical direction 105 0 The body 108 defines a pair of slots 132a and 132b that extend into the support plate 124 along the axis 106 toward the transverse surface 116. The slots 132 terminate where the first and second bending walls 113 and 117 connect to the plate 124.

The body 108 defines a plane 158 that is perpendicular the upper and lower surfaces 110 and 112 and pass along, or intersects terminal ends (not numbered) of the slots 132a and 132b. The first and second bending walls 113 and 117 extend from the support wall 114 to the plate 124. In this regard, the first and second bending walls 113 and 117 define a length 119 that extends from the support wall surface 156 to the plane 158. Further, the first and second bending walls 113 and 117 taper as the walls 113 and 117 extend along the axis 106 toward the plate 124. The body 108, for instance the support wall 114, defines a transverse height 160 that extends from the upper surface 110 to the lower surface 112. The support wall 114 also defines a thickness 162 that extends from the outer surface 154 to the inner surface 156. The body 108 is configured such that the support wall 114 may have a greater resistance to bending than the bending walls 113 and 117. In other words, the support wall 114 can be said to be stiffer than the walls 113 and 117. For instance, the thickness 162, length 119 and height 160 can be selected so that walls 113 and 117 can flex or bend in response to a load 121 applied normal the outer surface 154 along the axis 106. When a load 121 is applied normal to the support wall 114, the walls 113 and 117 bend outwardly and away from each other along the vertical direction 105. The bending of the walls 113 and 117 create a tensile stress toward the center of the first and second bending walls 113 and 117 and compressive stresses at the bending walls 113 and 117 closer to the support wall 114. The strain gauge member 100 is configured to create tensile and compression amplification zones 212 and 214 along the upper surface 110, as further detailed below.

The biasing portion 104 includes a biasing member 134 and an endplate 136 spaced apart from the support wall 114 along the axis 106 in an extended position. The biasing member 134 couples the support wall 114 to the endplate 136. The endplate 136 is configured to contact the recess side wall 42 when the strain sensor assembly 50 is disposed in the recess. Thus, the endplate 136 defines an engagement surface 138 that is disposed along vertical direction 105 so as to face the recess side wall 42. Accordingly, the engagement surface 138 can be opposed to the first and second abutment surfaces 86 and 118 described above. Further, the biasing member 134 biases the endplate 136 outwardly away from the support wall 114 in an extended position. The biasing member 134 is also configured so that, in response to a force applied to the endplate 136 along the axis 106, the endplate 136 is deflected toward the support wall 114 into a loaded position. In accordance with the illustrated embodiment, the biasing member 134 has a serpentine shape. It should be appreciated that the biasing member 134 can be a spring, for instance a helical spring, or leaf spring. The biasing member 134 can be any structure or device that can bias the endplate 136 away from the support wall 114 yet allow the endplate 136 to deflect toward the support wall 114 when a force is applied to the endplate 136 along the axis 106.

The strain sensor assembly 50 is configured to have a first or initial configuration and an installed configuration. The initial configuration is when the strain sensor assembly 50 is outside of the recess and the respective endplates 136 are in their extended positions. When the strain sensor is in the installed configuration, for instance placed in the recess 40, the biasing member 134 urges the endplate 136 against the recess side wall 42, applying a force against the recess side wall 42. Further, the biasing member 134 causes the opposing strain gauge member abutment surface 118 to apply an opposing force against the abutment wall 86. When the endplates 136 of each pair of strain gauge members 100a and 100b engage the recess side wall 42, the strain sensor assembly 50 has an interference fit with the recess side wall 42.

In a preferred example of the strain gauge member 100, the body 108 is configured so that when a force or load 121 is applied normal to the plate 136 along the axis 106, both tensile and compression components are applied along the upper surface 110. The body 108 can define at least one plane 166a (and/or 166b) that extends along the upper and/or lower surfaces 110 and 112. When a force 121 is applied normal to the plate 136, tensile and compression stress are created along at least one plane 166a and 166b defined by the body 108, the plane 166a and/or 116b being parallel to the direction along which the force 121 is applied. As will be further detailed below, when a force 121 is applied the strain gauge member 100, the body 108 creates tensile and compression amplification zones 212 and 214. The load amplification zones 212 and 214 improve load detection capabilities not realized in typical strain sensors.

Figure 12:
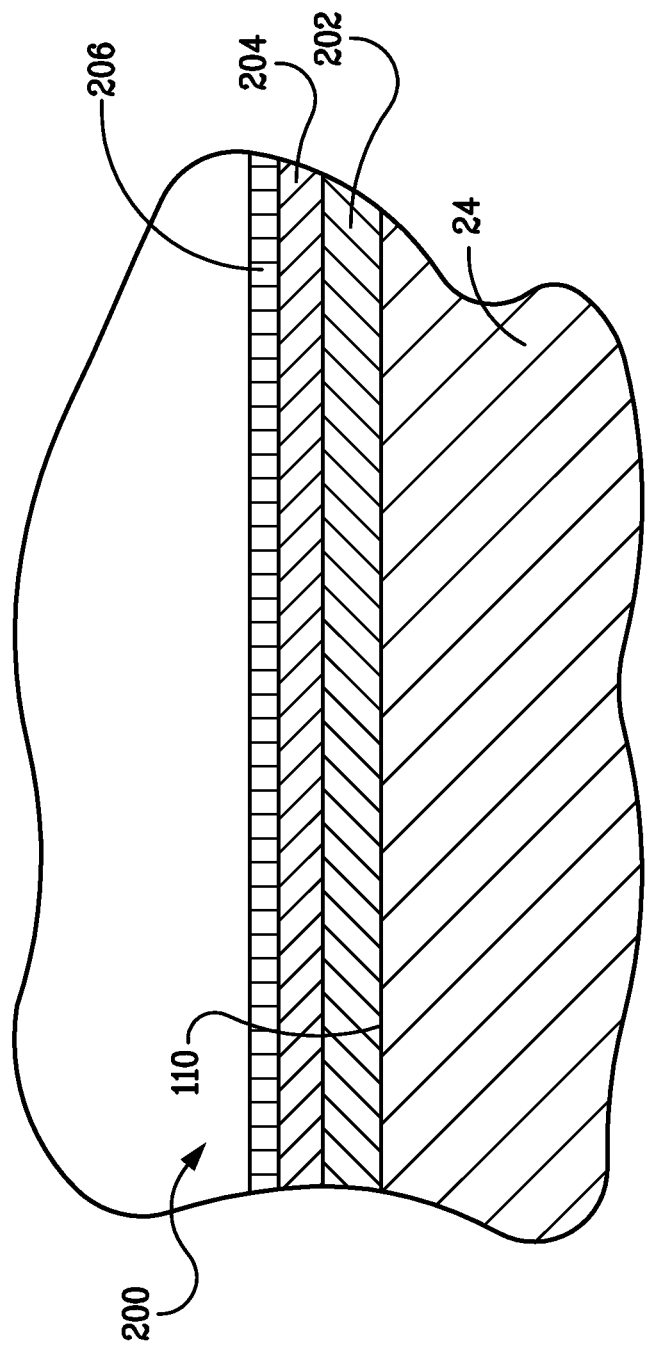
FIG. 12 is a detailed sectional view of the strain gauge carried by the strain gauge member shown in FIGS. 10 and 11.

Continuing with FIG. 10, each strain gauge sensor 200 is supported by the support plate 124 along the upper surface of the body 108. Various strain gauge configurations can be used in accordance with the present disclosure. For instance, the strain gauge sensor according to one embodiment is a thin film strain gauge sensor 220 or "thin film sensor". Referring to FIG. 12, the thin film sensor can include an insulation layer 202 adjacent to the upper surface 110 of the strain gauge member body 108, an alloy layer 204 applied to the insulation layer 202, and a protective layer 206 applied to the alloy layer 204. Any thin film strain gauge construction can be used. For instance, the alloy layer 204 can be formed via variety of deposition techniques, such as sputtered deposition, chemical vapor deposition or other process for applying a material to surface. The alloy layer 204 can be a copper, nickel or silicon dioxide, nickel, nickel chrome layers, tertiary alloys, copper-nickel alloys, constatine foil or other suitable alloys. Laser ablation may be used to define the strain gauge pattern into the alloy layer 204. Further, it should be appreciate that insulation layer 202 can be any insulation material suitable thin film strain gauge applications. Exemplary material includes aluminum oxide, glass oxide, fibrous backing, or any other insulation material. Further, in alternate embodiments, cold reduced foil of metal laminated to fibrous layer can be used to separate the alloy and insulation layers 204 and 202. The protective layer 206 can be aluminum oxide, silicone oxide, or any other suitable protective coating. In other embodiments, the strain gauge sensor 200 can be a bonded foil strain gauge. Any strain gauge implementation can be used on strain gauge sensor 200.

When the strain sensor assembly 50 is placed in the recess 40 subject to a load, strain is distributed along the strain gauge sensor 200 such that tensile and compressive components of strain are spaced apart from each other along the axis 106. For instance, when a load 121 is applied to the strain gauge member 100 along the axis 106, via the recess side wall 42, the tensile strain components are arranged along the plane 166a aligned with the surface 110 above the support wall 114 and cavity 137 of the strain gauge member 100. Compressive strain components are concentrated along the plane 166a aligned with the surface 110 above the terminal end (not numbered) of the upper most slot 132. It can be said that the strain gauge sensor 200 has a tensile amplification zone 212 and a compression amplification zone 214 spaced from the tensile amplification zone along the axis 106. The strain gauge member 100 thus has a structure that magnifies or concentrates the deformation from the load applied to the strain gauge member 100, for instance which would be loads applied the drill string 6. In this regard, stress risers are produced at the respective tensile and compression amplification zones 212 and 214 that concentrate the tensile and compressive strain components applied to the strain gauge member 100 at the respective amplification zones. Because the tensile and compressive strain components loads are amplified along the respective strain gauge, the strain gauge member 100 amplifies the resistance change detected across a series of strain gauge members 100 connected in a circuit, when such loads are applied to the strain sensor assembly 50. Because the resistance change due to a respective load is amplified, the signal generated by strain sensor assembly 50 has less noise and voltage amplifiers are not required to generate the signal indicative of the applied load. It should be appreciated that in certain applications, a voltage amplifier could be used.

The strain sensor assembly 50 is configured such that the strain gauge members 100a and 100b can be aligned with the axial direction of force application A and the strain gauge members 100c and 100d can be aligned with the lateral direction of force application F. For instance, the strain sensor assembly 50 can be placed in the recess such that the first axis 76 is aligned with the central longitudinal axis 32 of the drill string, and the second axis 78 of the strain sensor assembly 50 is perpendicular to the central longitudinal axis 32 of the drill string. Further, to obtain torsional load data, the strain sensor assembly 50 can be placed in the recess such that the first axis 76 of the strain sensor assembly 50 is offset about 45 degrees with respect to the central longitudinal axis 32 of the drill string 6. Depending on the placement and orientation of the strain sensor assembly, the computing device 28 can be configured to process the load data, or signal, detected by the strain sensor assembly 50 while accounting for 1) the position of the strain sensor assembly 50 along the drill string 6, and 2) orientation of the strain sensor assembly 50 in the respective recess. The load data can be used with various analytical methods and systems for generating drilling parameter information as discussed above.

In accordance with the illustrated embodiment, the strain gauge member 100 can include one or more strain gauge sensors 200. According to one embodiment, each respective strain gauge member 100 include a single strain gauge sensor 200. Thus, four strain gauge members 100a, 100b, 100c, and 100d can define a Wheatstone bridge. Alternatively, the strain gauge member 100 can include up to four or more strain gauge sensors 200 (not shown). For instance, each respective strain gauge support member 100a, 100b, 100c, and 100d includes four (or more) strain gauge sensors 200. Thus, each strain gauge member 100 can include strain gauges to define a Wheatstone bridge contained on a respective strain gauge member 100. Embodiments of how the strain gauge sensors 200 can be arranged along a Wheatstone bridge will be discuss next.

Figure 13:
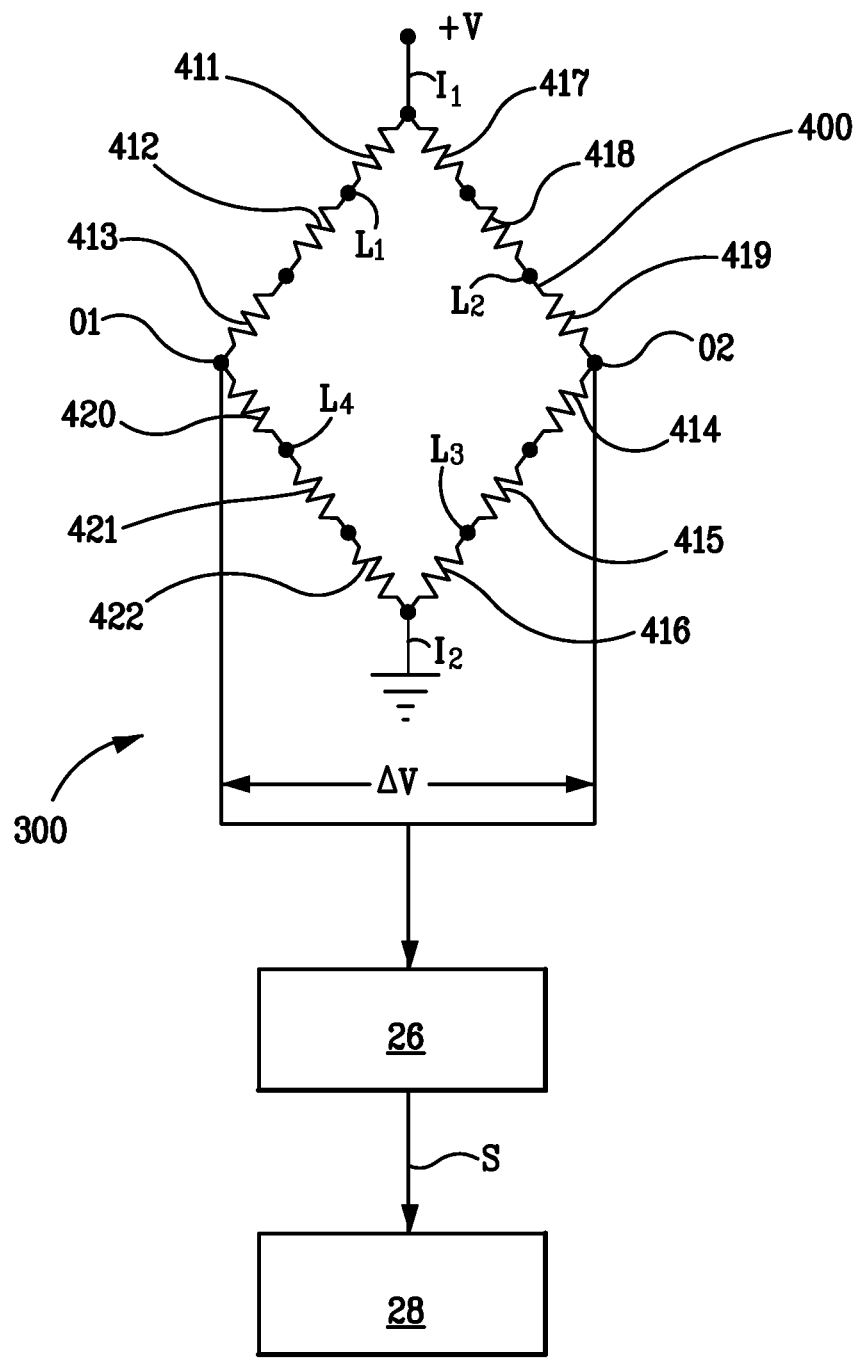
FIG. 13 is a circuit diagram of a plurality of strain sensors according to an embodiment of the present disclosure.

FIG. 13 illustrate a schematic circuit diagram for one or more strain sensor assemblies as described herein. The circuit 300 can include a Wheatstone bridge 400 configured for electrical connection to the communications module 26 and the computing device 28. The strain sensor assembly 50, 150, 250 are configured so that when the respective strain sensor assemblies are placed in the recess, the Wheatstone bridge 400 is in electrical communication with the communications module 26 and a power source.

Continuing with FIG. 13, in accordance with an illustrated embodiment of a circuit 300, three strain sensor assemblies 50, 150 and 250 (FIGS. 3 and 4) are positioned in respective recesses 40, 140, and 240 so as to detect axial and lateral loads. In the illustrated embodiment of the circuit 300, the strain gauge members 100a and 100b of one strain sensor assembly 50, 150, and 250 are orientated along the axial direction of force application A so as to measure axial loads. Accordingly, the strain gauge members 100c and 100d of strain sensor assembly 50, 150 and 250 would be oriented along the lateral direction of force application L. The strain gauge members could be arranged in the recess so that the strain gauge members 100a and 100b are offset 45 degree relative to the drill string axis 32 so as the determine torsional loads as discussed above. In any event, the Wheatstone bridge 400 illustrated in FIG. 13 includes three strain sensors 50, 150 and 250 connected in series. Thus, the first Wheatstone bridge 400 comprises twelve strain gauge members 100 arranged in four legs L1, L2, L3, and L4. Leg L1 is opposite to leg L3 and leg L2 is opposite to leg L4. Each respective strain gauge member 100a from each respective strain sensor assembly 50, 150, 250 is connected in series along the respective legs L1, L2, L3, L4 based on the orientation of the respective strain gauge member 100 in the recess 40, 140 and 240. According to the illustrated embodiment, each leg L1, L2, L3, and L4, includes three strain gauge members 100, one from a similar angular position in each of the recess 40, 140, and 240. For instance, the first leg L1 includes strain gauge members 100a located in recess 40, 140 and 240 orientated along the axial direction at the 0 degree position, denoted in FIG. 13 as first leg strain gauge members 411, 412, and 413. The third leg L3 includes strain gauge members 100b located in recess 40, 140 and 240 orientated along the axial direction at the 180 degree position, denoted in FIG. 13 as third leg strain gauge members 414, 415, and 416. The second leg L2 includes strain gauge members 100c located in recess 40, 140 and 240 orientated along the lateral direction at the 90 degree position, denoted in FIG. 13 as third leg strain gauge members 417, 418, and 419. Leg L4 includes strain gauge members 100d located in recess 40, 140 and 240 orientated along the lateral direction at the 270 degree position, denoted in FIG. 13 as fourth leg strain gauge members 420, 421, and 422.

The Wheatstone bridge includes input and output terminals. The output terminals are in electronic communication with the electronic components 37 (FIG. 4), such as a voltage detector (not shown) and/or the communications module 26. Legs L1 and L2 form a junction that defines a first input terminal I1, while the junction formed by legs L3 and L4 forms a second input terminal I2. The junction formed by legs L1 and L4 forms a first output terminal O1, while the junction formed by legs L2 and L4 forms a second output terminal O2. Additional Wheatstone bridges can be configured in a similar manner. Alternatively, the strain sensors may be wired in parallel.

During operation a voltage V is applied across the pair of input terminals I1 and I2. The resistance of the strain gauge sensors 411-422 in the bridge 400 is such that when the strain gauges are unstrained, the bridge is balanced and the voltage across the pair of output terminals O1 and O2 is zero or near zero. However, the resistance of the strain gauges 411-422 varies proportionately with the strain so that distortion of the portion of the structure along recess side wall 42 will result in a voltage differential across the output terminals O1 and O2. The electronic components 37 can generate an output signal S, which is representative of the strain sensed by strain gauge members 100. The output signal S can be transmitted to the communications module 26, which can then transmit the signal S to a mud pulse telemetry system (not shown) for transmission to a computing device 28 at the surface using the mud pulser (not shown). The computing device 28 can analyze the output signal S to yield weight and torque on the drill bit data for the drilling string 6 during a drilling operation.

According to embodiments of the present disclosure, because the strain gauge members 100 are configured to concentrate stresses at the tensile and compression amplification zones, voltage amplifiers that are typically installed with strain sensors are not required components. As such, applications where space limitations limit use of certain strain sensors, the strains sensor assemblies 50, 150, 250 as described herein may be used.

According to alternate embodiments, the strain sensor assembly 50 can include one or more Wheatstone bridges connected along a circuit and configured to detect loads applied to a structure. Thus, while FIG. 13 illustrates a Wheatstone bridge 400 across three strain sensor assemblies 50, 150, and 250 other configuration as possible. For example, the strain sensor assembly 50 can include four strain sensors 200 disposed on a single strain gauge member 100 and defining a single Wheatstone bridge on single strain gauge member. The strain sensor assembly 50 can therefore 16 strain sensors 200 and up to four separate Wheatstone bridges. In such an embodiment, the Wheatstone bridge include the four strain gauge sensors 200 disposed on each respective strain gauge members 100a, 100b, 100c, and 100d. Each strain gauge sensor being connected to define the Wheatstone bridge. Further, each strain sensor assembly 50 can include a respective strain gauge sensor disposed on a respective strain gauge member 100. In such an embodiment, the strain sensor 50 includes four strain gauge sensors 200 disposed on each respective strain gauge members 100a, 100b, 100c, and 100d and connected connected to define the Wheatstone bridge. In addition or alternatively, however, four strain sensor assemblies (50, 150, 250, etc.) can be also connected to define a Wheatstone bridge. For instance, each strain sensor assembly can include four strain sensors distributed across the four strain gauge members 100a, 100b, 100c, and 100d. The Wheatstone bridge can include strain gauge sensor from the first strain sensor assembly 50, a strain gauge sensor from the second strain sensor assembly 150, a strain gauge sensor from the third strain sensor assembly 200, and a fourth strain gauge sensor 200 from the fourth strain sensor assembly 250. Additional Wheatstone bridges can be defines across additional sets of strain gauge sensors of multiple strain sensor assemblies as needed. For example, four strain sensor assemblies each having four strain gauge sensors can be wired to create four separate Wheatstone bridges as needed. Thus, the strain sensor assemblies 50, 150 and 250 described herein can also be connected along one or more Wheatstone bridges as described in U.S. Pat. No. 8,397,562, incorporated by reference in its entirety in this document. A person of skill in the art will appreciate the principles discussed above and shown in FIG. 13, and could apply these principles to addition Wheatstone bridge configurations not explicitly illustrated in the drawings or set forth in herein.

Figure 15:
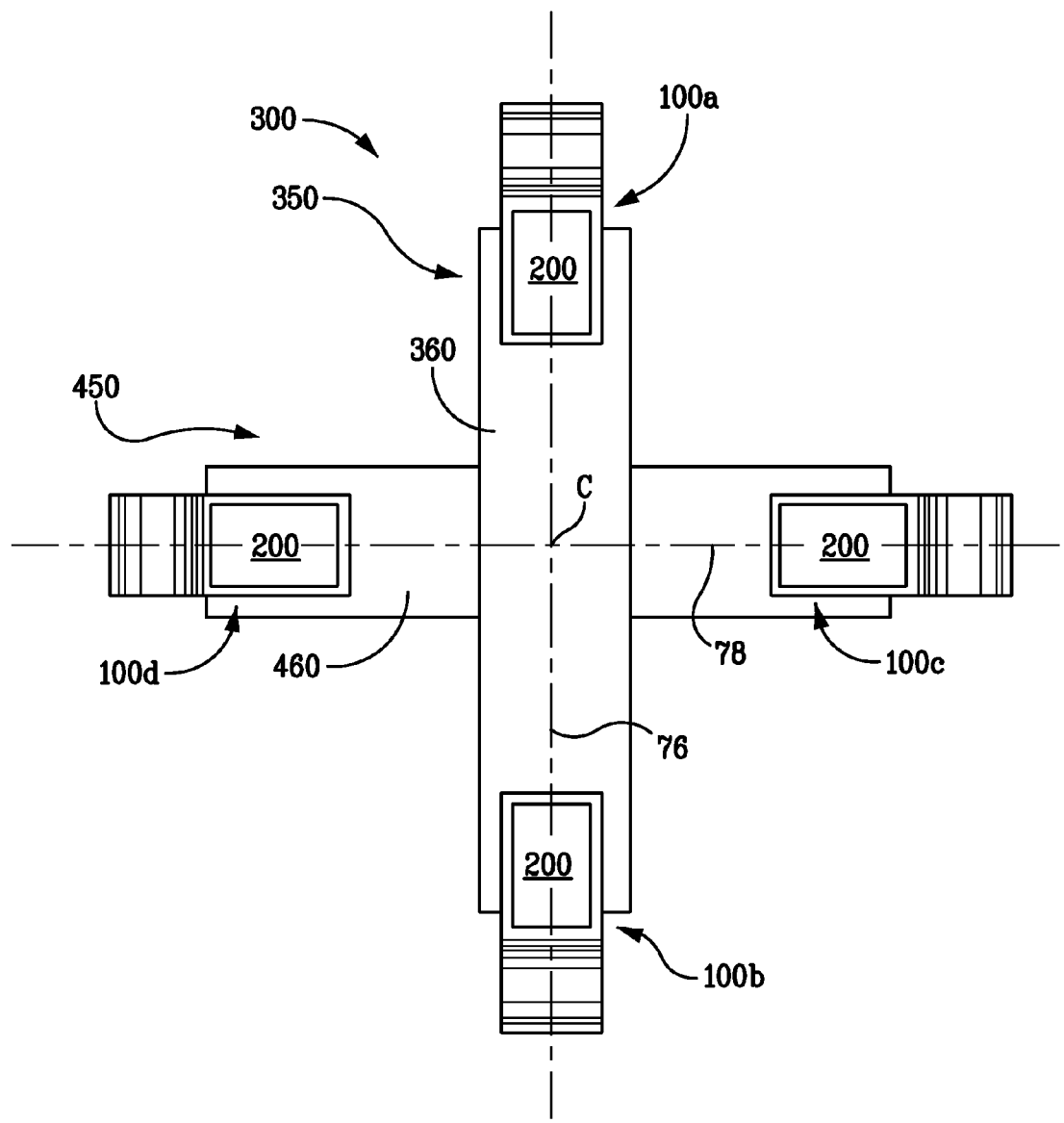
FIG. 15 is a top plan view of the strain sensor assembly shown in FIGS. 14A and 14B.

In accordance with another embodiment of the present disclosure, the strain sensor assembly 50 can include a pair of strain gauge members 100a and 100b supported by a rectilinear strain gauge support member 360. As shown in FIGS. 14A-15, the strain sensor 350 includes the strain gauge support member 360 with a pair notches 372a and 372b configured to receive strain gauge member 100a and strain gauge member 110b, respectively. Further, an additional strain sensor 450 can include strain gauge members 100c and 100d attached to a strain gauge support member 460. The strain sensor assembly 350 and 450 can be arranged in the recess (not shown) such that one of the strain sensor axes 76 and 78 are perpendicular with respect to each other of strain sensor axes. The strain sensor assemblies 350 and 450 can be connected in a Wheatstone bridge so detect a load. The strain sensor assemblies 350 and 450 are configured similar to the strain sensor assembly 50, with the exception of the support member 60.

In accordance with another embodiment of the present disclosure, there includes a method of manufacturing a strain sensor assembly 50 as described herein. The method of manufacturing can include forming at least one strain gauge member 100 having a support portion and biasing portion. The step of forming the strain gauge member 100 can include forming the body 108 via CNC machining or electrical discharge machining as described above. Further, the method can include a forming a strain gauge sensor 200 on the support portion. For instance, an insulation layer can be applied to the surface 110. Next, an alloy or silicone can be applied to the insulation layer. Then, a strain gauge pattern can be laser or chemically etched on the surface of the alloy. The etched strain gauge can be encapsulated with a protective layer. Terminals can be used to connect the strain gauge pattern to wires that complete the circuit. The strain gauge can also be a bonded foil strain gauge formed by adhering foil gauges to the strain gauge member. Each strain gauge member 100 can be attached to support member 60. The first and second strain gauge members are attached to support member 60 along the first axis of the support member 60, and the third and fourth strain gauge members are attached to the support member 60 along the second axis that is substantially perpendicular to the first axis. The method of attachment can includes welding the strain gauge members 100 to the support member 60. In particular, the strain gauge member ledge 126 contacts the upper surface 64 of the support member body 62, and the opposed sides walls 120 and 122 abut the notch side walls 84a and 84b, and the surface 118 abuts the abutment wall 86. Weldments 230 (FIG. 9) are used to secure strain gauge member 100 to the support member 60.

The strain sensor assembly 50 can be used in a method of replacing a strain sensors in a structure subject to a load. According to one embodiment of the method of the strain sensor assembly replacement, the method can include removing an existing or first sensor assembly from a recess of the structure. Next, the method can including a placing a second sensor assembly into the recess of the structure such that the second sensor assembly forms an interference fit with the at least one wall of the recess as discussed above. Further, the method can include forming an electronic connection with a communication module 26. The method can also include completing a circuit between the second sensor assembly and additional sensors disposed in the structure. The method of completing a circuit can include wiring a plurality of strain gauge members 100 into one or more Wheatstone bridges so as to form a complete circuit across which a change in resistance can be detected as is known in the art. Wiring can interconnect one or more Wheatstone bridges, each including for instance multiple strain gauge sensors, with the communication module 26. A Wheatstone bridge can include less than four strain gauge members. The second sensor assembly includes a set of strain gauges and the method further comprises forming an electrical connection among the set of strain gauge sensors as described herein.

Although the invention has been described with reference to preferred embodiments or preferred methods, it is understood that the words which have been used herein are words of description and illustration, rather than words of limitation. For instance, it should be appreciated that the structures and features of the strain sensors and systems described herein and their components can be incorporated into any of the other embodiments of the strain sensors and systems described herein and their components, unless otherwise indicated. Furthermore, although the invention has been described herein with reference to particular structure, methods, and embodiments, the invention is not intended to be limited to the particulars disclosed herein, as the invention extends to all structures, methods and uses that are within the scope of the present invention. Those skilled in the relevant art, having the benefit of the teachings of this specification, may affect numerous modifications to the invention as described herein, and changes may be made without departing from the scope and spirit of the invention, for instance as recited in the appended claims.

What is claimed:

1. A strain sensor assembly configured for removable placement in a recess of a drill string component of a drilling system, the strain sensor assembly comprising:
    a support member configured for placement in the recess, the support member defining an axis; and
    at least one pair of opposed strain gauge members that extend from the support member, the pair of strain gauge members spaced apart from each other along the axis, each strain gauge member defining a body defining an upper surface, a lower surface spaced from the upper surface along a vertical direction that is substantially perpendicular to the axis, wherein the body includes 1) a support portion carried by the support member defining a support plate and including at least one strain gauge sensor disposed on the support plate, 2) a biasing portion that extends from the support portion along the axis such that the support plate extends generally along the axis away from the biasing portion, the biasing portion including an endplate coupled to the support portion via a biasing member, the endplate defining an engagement surface that is angularly offset with respect to the axis such that the engagement surface is configured to face and bias against a wall of the recess of the drill string when the strain sensor assembly is disposed in the recess, and 3) a pair of bending walls that extend from a support wall toward the support plate and are configured to concentrate tensile and compressive stress along a plane that is parallel to the axis when a force is applied along the axis, wherein the pair of bending walls includes a first bending wall and a second bending wall, the first bending wall defined by the upper surface and a first inner surface opposed to the upper surface along the vertical direction, and the second bending wall defined by the lower surface and a second inner surface opposed to the lower surface along the vertical direction, wherein the body further defines a cavity that extends from the first inner surface to the second inner surface and a first slot partially defined by the first inner surface that extends from the cavity to a first terminal end along a direction that is substantially parallel to the axis,
    wherein the strain sensor assembly is configured such that the respective endplates of the at least a pair of strain gauge members form an interference fit with the wall of the recess when the strain sensor assembly is inserted in the recess.

2. The strain sensor assembly according to claim 1, wherein the at least one strain gauge sensor is four strain gauge sensors that are connectable so as to define a Wheatstone bridge.

3. The strain sensor assembly according to claim 1, wherein each strain gauge sensor is connectable along a Wheatstone bridge.

4. The strain sensor assembly according to claim 1, wherein the at least one strain gauge sensor is a thin film strain gauge sensor.

5. The strain sensor assembly according to claim 1, wherein the at least one strain gauge sensor is a bonded foil strain gauge sensor.

6. The strain sensor assembly according to claim 1, wherein the pair of bending walls taper as they extend along the axis toward the support plate.

7. The strain sensor assembly according to claim 1, wherein the biasing member couples the support wall to the endplate.

8. The strain sensor assembly according to claim 1, wherein the biasing member has a serpentine shape.

9. The strain sensor assembly according to claim 1, wherein the biasing member is a spring.

10. The strain sensor assembly according to claim 1, wherein the axis is a first axis, and the support member defines a second axis that is substantially perpendicular to the first axis, wherein the at least one pair of opposed strain gauge members is a first pair of strain gauge members carried by the support member and aligned along the first axis, and a second pair of strain gauge members carried by the support member and aligned along the second axis.

11. The strain sensor assembly of claim 1, wherein the body of each strain gauge member defines a first axis, the body including a first end, a second end spaced from the first end along the first axis, a first surface, and a second surface opposed to the first surface along a second axis that intersects and is perpendicular to the first axis, wherein the body is configured such that when the force is applied to the body along the first axis, the tensile stress and the compressive stress are spaced apart with respect to each other along the first axis.

12. The strain sensor assembly of claim 1, wherein the body defines a second slot extending from the cavity to a second terminal end along the direction, wherein the second slot is partially defined by the second inner surface.

13. The strain sensor assembly of claim 12, wherein the plane intersects the first terminal end and the second terminal end.

* * * * *